United States Patent
Millett et al.

(10) Patent No.: US 9,229,701 B2
(45) Date of Patent: Jan. 5, 2016

(54) LOCAL STORE DATA VERSIONING (71) Applicant: Microsoft Corporation, Redmond, WA (US)

(72) Inventors: Thomas W. Millett, Mill Creek, WA (US); Mihir Ray, Redmond, WA (US); Paul John Bowden, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/904,616

(22) Filed: May 29, 2013

(65) Prior Publication Data
US 2014/0282468 A1    Sep. 18, 2014

Related U.S. Application Data (60) Provisional application No. 61/789,296, filed on Mar. 15, 2013.

(51) Int. Cl.
G06F 9/445    (2006.01)
G06F 9/44    (2006.01)
G06F 9/54    (2006.01)

(52) U.S. Cl.
CPC .. G06F 8/65 (2013.01); G06F 8/71 (2013.01); G06F 9/541 (2013.01)

(58) Field of Classification Search
None
See application file for complete search history.

(56) References Cited

U.S. PATENT DOCUMENTS

| | | | |
|---|---|---|---|
| 6,058,428 A * | 5/2000 | Wang et al. | 709/232 |
| 7,406,499 B2 | 7/2008 | Singh et al. | |
| 7,594,003 B2 | 9/2009 | Davidson et al. | |
| 7,761,419 B2 | 7/2010 | Wray | |
| 7,818,740 B2 * | 10/2010 | Bankston | G06F 8/65 707/638 |
| 8,146,074 B2 * | 3/2012 | Ito et al. | 717/170 |
| 8,341,193 B2 * | 12/2012 | Jones et al. | 707/803 |
| 8,370,467 B1 | 2/2013 | Sauer | |
| 8,594,850 B1 * | 11/2013 | Gourlay et al. | 700/276 |
| 8,701,103 B1 * | 4/2014 | Hsu et al. | 717/171 |
| 2002/0144250 A1 * | 10/2002 | Yen | 717/168 |
| 2003/0145315 A1 | 7/2003 | Aro et al. | |

(Continued)

OTHER PUBLICATIONS

Genevès, P. et al., Identifying query incompatibilities with evolving XML schemas, Proceedings of the 14th ACM SIGPLAN international conference on Functional programming, 2009, pp. 221-230, [retrieved on Aug. 20, 2015], Retrieved from the Internet: <URL:http://dl.acm.org/>.*

(Continued)

*Primary Examiner* — Tuan Q. Dam
*Assistant Examiner* — Geoffrey St Leger
(74) *Attorney, Agent, or Firm* — Louise Bowman; Doug Barker; Micky Minhas (57) ABSTRACT

Embodiments are directed to maintaining coherence between web application versions, to maintaining proper versions between web application clients and servers and to determining whether to apply a web application update. In one scenario, a computer system receives a data request from a web application client for certain specified data. The data is indexed according to a web application schema, and the data request includes a web application client version identifier. The computer system determines that the requested data is not accessible using the web application schema, updates the web application schema to a current version of the web application schema and processes the received data request using the updated web application schema.

17 Claims, 5 Drawing Sheets

(56) References Cited

U.S. PATENT DOCUMENTS

| | | | |
|---|---|---|---|
| 2005/0138081 A1* | 6/2005 | Alshab et al. | 707/200 |
| 2007/0244905 A1* | 10/2007 | Ito et al. | 707/10 |
| 2008/0162728 A1 | 7/2008 | Robeal et al. | |
| 2008/0234987 A1 | 9/2008 | Haley | |
| 2008/0301672 A1* | 12/2008 | Rao et al. | 717/177 |
| 2009/0064126 A1* | 3/2009 | Elord | G06F 9/541 717/170 |
| 2009/0193407 A1* | 7/2009 | Lepeska | G06F 8/71 717/170 |
| 2010/0010915 A1* | 1/2010 | Shea et al. | 705/26 |
| 2011/0173168 A1* | 7/2011 | Jones et al. | 707/695 |
| 2011/0302571 A1 | 12/2011 | O'Farrell et al. | |
| 2012/0265798 A1* | 10/2012 | Tewari et al. | 709/201 |
| 2013/0066832 A1 | 3/2013 | Sheehan et al. | |
| 2014/0019952 A1* | 1/2014 | Shamsaasef | G06F 8/65 717/170 |
| 2014/0173586 A1* | 6/2014 | Dugan | G06F 8/65 717/173 |
| 2014/0222856 A1* | 8/2014 | Lakshminath et al. | 707/769 |

OTHER PUBLICATIONS

Senivongse, T., Enabling flexible cross-version interoperability for distributed services, Proceedings of the International Symposium on Distributed Objects and Applications, 1999, pp. 201-210, [retrieved on Aug. 20, 2015], Retrieved from the Internet: <URL:http://ieeexplore.ieee.org/>.*

"Deploying and Versioning Applications", Published on: Dec. 25, 2008, Available at: http://msdn.microsoft.com/en-us/library/bb726035.aspx.

"Introduction to Sync Framework Database Synchronization", Retrieved on: May 14, 2013, Available at: http://msdn.microsoft.com/en-us/data/bb887608.aspx.

International Search Report & Written Opinion for PCT Application No. PCT/US2014/023706, Mailed Date: Aug. 8, 2014, Filed Date: Mar. 11, 2014, 21 pages.

"International Preliminary Report on Patentability Issued in PCT Application No. PCT/US2014/023706", Mailed Date: Jun. 25, 2015, 12 Pages.

* cited by examiner

LOCAL STORE DATA VERSIONING

CROSS-REFERENCE TO RELATED APPLICATIONS

This application claims priority to and the benefit of U.S. Provisional Application Ser. No. 61/789,296, filed on Mar. 15, 2013, entitled "Local Store Data Versioning", which application is incorporated by reference herein in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, software applications that are primarily designed for synchronous communication with a server can be designed to allow offline functionality. For instance, a personal information management application that allows user access to email, contacts and calendar information, may be configured both for online access and offline access. In offline mode, a user makes changes to his or her email, contacts or calendar appointments and these changes are queued until the next time the user is online. This offline period may be relatively short (e.g. during a flight), or may be extensive. When the user brings the application back online, backend server code may have changed, introducing potential client/server version mismatches.

BRIEF SUMMARY

Embodiments described herein are directed to maintaining coherence between web application versions, to maintaining proper versions between web application clients and servers and to determining whether to apply a web application update. In one embodiment, a computer system receives a data request from a web application client for certain specified data. The data is indexed according to a web application schema, and the data request includes a web application client version identifier. The computer system determines that the requested data is not accessible using the web application schema, updates the web application schema to a current version of the web application schema and processes the received data request using the updated web application schema.

In another embodiment, a client computer system sends a data request to a web application server for data corresponding to a web application client user. The data request includes a header that itself includes a current version identifier for the web application client. The client computer system receives, from the web application server, an indication that the web application client is improper and, in response to the indication, sends a request for web application client updates. The client computer system also receives at least one of the requested updates for the web application client and resends the data request to the web application server for the data corresponding to the web application client user.

In yet another embodiment, a computer system sends a manifest request that includes a first cookie. The first cookie includes a current version identifier and a mode identifier for the web application client. The computer system receives the requested manifest, which itself includes a second cookie having metadata that has at least one of the following: a server code version identifier for a current version of web application server code and a user-specific, client-side installation modifier. The computer system then accesses the second cookie of the received manifest to determine which updates are to be applied to the web application client, based on the version identifiers included in the second cookie's metadata, and determines whether to apply the determined updates to the web application client based on a specified level of importance for each determined update.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to maintaining coherence between web application versions, to maintaining proper versions between web application clients and servers and to determining whether to apply a web application update. In one embodiment, a computer system receives a data request from a web application client for certain specified data. The data is indexed according to a web application schema, and the data request includes a web application client version identifier. The computer system determines that the requested data is not accessible using the web application schema, updates the web application schema to a current version of the web application schema and processes the received data request using the updated web application schema.

In another embodiment, a client computer system sends a data request to a web application server for data corresponding to a web application client user. The data request includes a header that itself includes a current version identifier for the web application client. The client computer system receives, from the web application server, an indication that the web application client is improper and, in response to the indication, sends a request for web application client updates. The client computer system also receives at least one of the requested updates for the web application client and resends the data request to the web application server for the data corresponding to the web application client user.

In yet another embodiment, a computer system sends a manifest request that includes a first cookie. The first cookie includes a current version identifier and a mode identifier for the web application client. The computer system receives the requested manifest, which itself includes a second cookie having metadata that has at least one of the following: a server code version identifier for a current version of web application server code and a user-specific, client-side installation modifier. The computer system then accesses the second cookie of the received manifest to determine which updates are to be applied to the web application client, based on the version identifiers included in the second cookie's metadata, and determines whether to apply the determined updates to the web application client based on a specified level of importance for each determined update.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Figure 1:
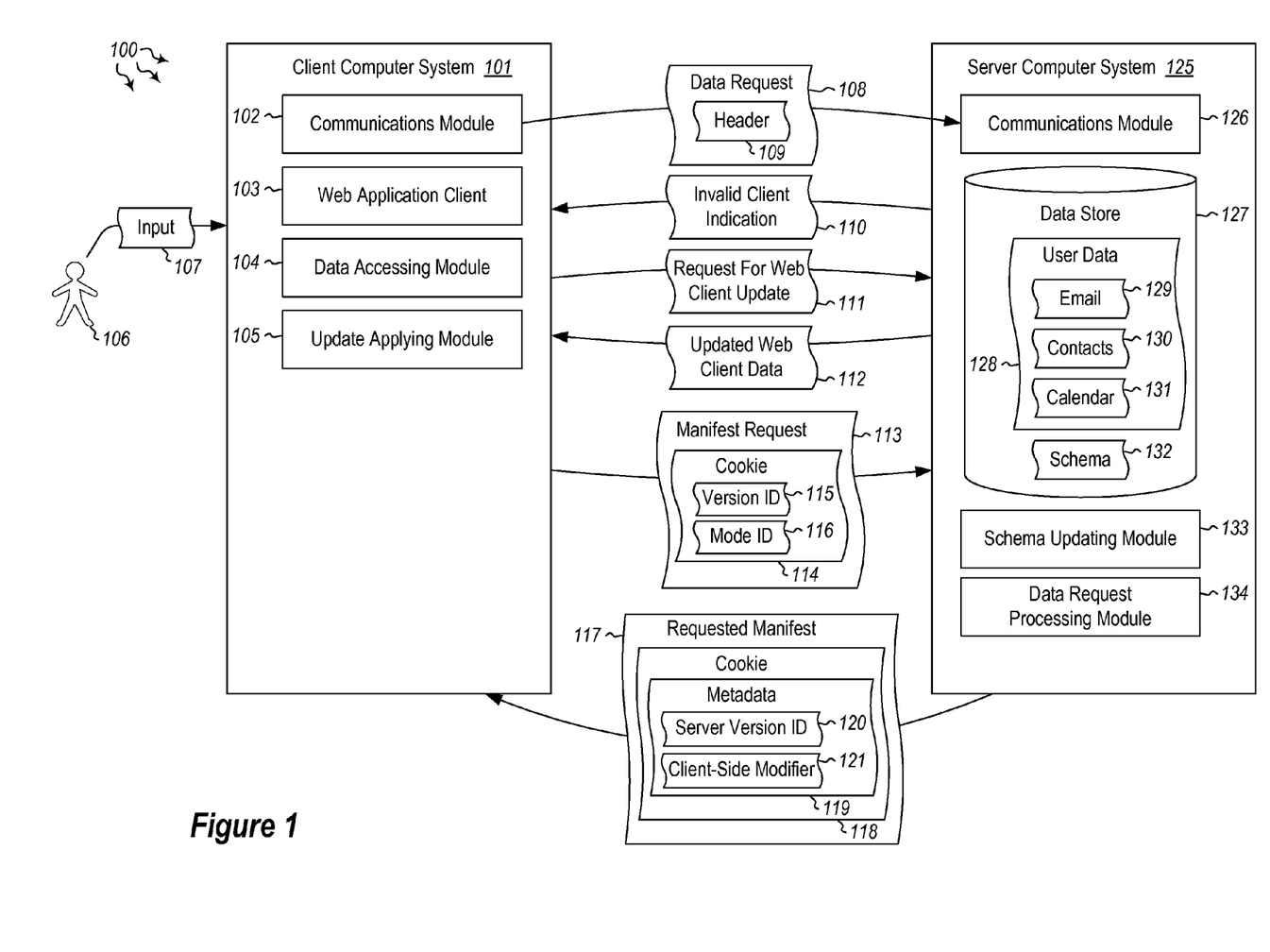
FIG. 1 illustrates a computer architecture in which embodiments described herein may operate including maintaining coherence between web application versions.

FIG. 1 illustrates a computer architecture 100 in which at least one embodiment may be employed. Computer architecture 100 includes client computer system 101 and server computer system 125. Computer systems 101 and 125 may be any type of local or distributed computer systems, including cloud computing systems. Each computer system includes modules for performing a variety of different functions. For instance, each computer system has a communications module (102 and 126, respectively). The communications modules may communicate internally with other modules, or externally with other computer systems. The communication may be over wired, wireless or other types of communication networks.

The client computer system 101 has a web application client 103, which may be a personal information management web application client. This web application client 103 may allow user 106 to access email 129, contacts 130, calendar 131 and other user data 128 through a web browser. The web application client 103 may be configured to run in substantially any type of web browser, on substantially any type of operating system. Using inputs 107, the user 106 can interact with and perform actions on his or her email, contacts or calendar.

The web application client 103 (or the communications module 102) may send a data request 108 to the server 125 requesting data for the web application. The data request may include a header 109 that includes version information for the web application client, thus notifying the server what version the client is running. The server's communications module 126 may receive the data request, and determine whether the web client is running a client software version that is out of date. If the web client 103 is out of date or is otherwise incompatible with the current version running on the server 125, the server will send an invalid client indication 110 to the client computer system 101, informing the client computer system that it will need to upgrade its web client before it can continue. In response, the client computer system 101 may send a request for web client update 111 to the server. The server can then send updated web client data 112 to the client computer system.

After the updated web client data has been received at the client computer system 101, the data accessing module 104 can access the updated data 112 and the update applying module 105 can update the web application client 103. Once the web application client 103 has been updated, it can then resend the data request 108 with updated header information 109 indicating that the web application client has been upgraded to the most current version. This data request will then be compatible with the schema 132 of the server computer system 125.

In some cases, the schema 132 used by the web application client 103 and/or the server's data store 127 to store and organize the user's data 128 may become out of date. For example, consider a scenario where the web application client 103 has been upgraded to a newer version. The user may then attempt to connect to a server, but the server may be on a different network, perhaps located in a different geographical location. The server to which the web application client has connected may be running an older version that is incompatible with the newer, upgraded web application client 103. The incompatibility may result in the web client sending a data request 108 using a data field that isn't available in the older schema (i.e. the schema on the server running the older version). In such cases, the server may indicate to the client computer system 101 that the data request 108 is invalid. The server's schema updating module 133 may then be used to update the schema 132. The data request may then be resent, and the data request processing module 134 may be used to process the web application client's data request 108. Because the schema version is now aligned with the client version, it will recognize the new data field in the data request that was previously incompatible.

Still further, in some cases, the client computer system 101 or the web application client 103 will request a manifest using manifest request 113. The manifest is a listing of files that may be retrieved from a data store (e.g. 127). The manifest request 113 may include a cookie 114 that itself includes a version ID 115 and a mode ID 116. The version may indicate the version of the web application client 103, while the mode ID may identify whether the web application client is to run in offline mode (which is generally for private use) or kiosk mode (which is generally for public use). The server computer system 125 may then send the requested manifest 117 to the client computer system 101. The manifest may include a cookie 118 that contains metadata 119. The metadata includes a server version ID 120 and a client-side installation modifier 121. The client computer system can then determine whether to apply new updates based on the server version ID 120 and the client-side installation modifiers 121. These concepts will be explained further below with regard to methods 200, 300 and 400 of FIGS. 2, 3 and 4, respectively.

Figure 2:
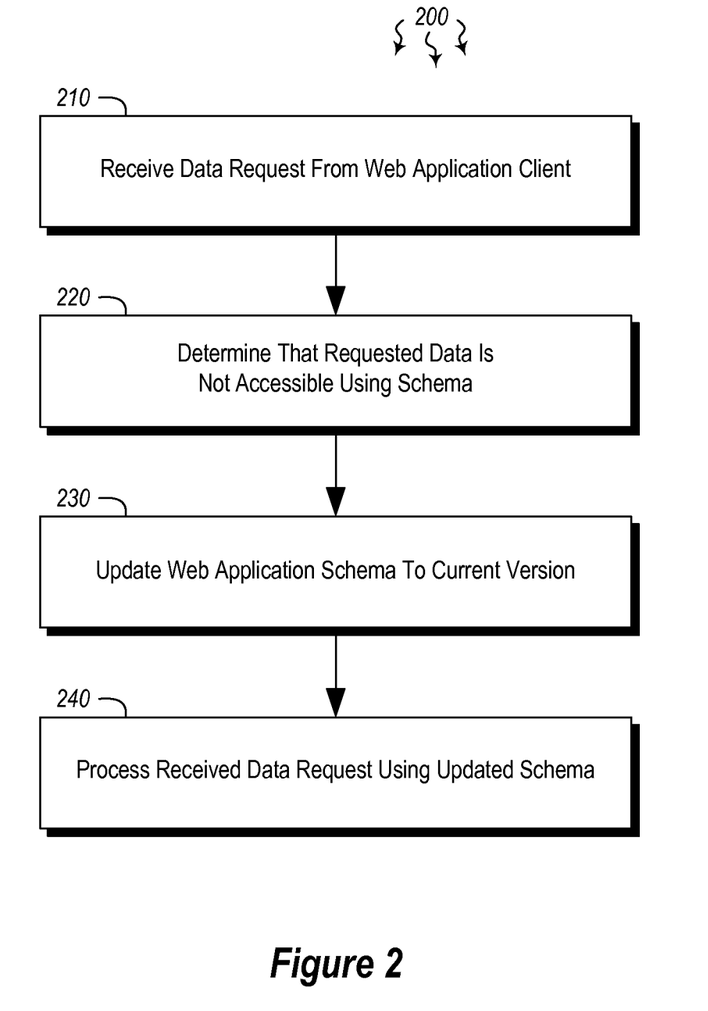
FIG. 2 illustrates a flowchart of an example method for maintaining coherence between web application versions.
Figure 3:
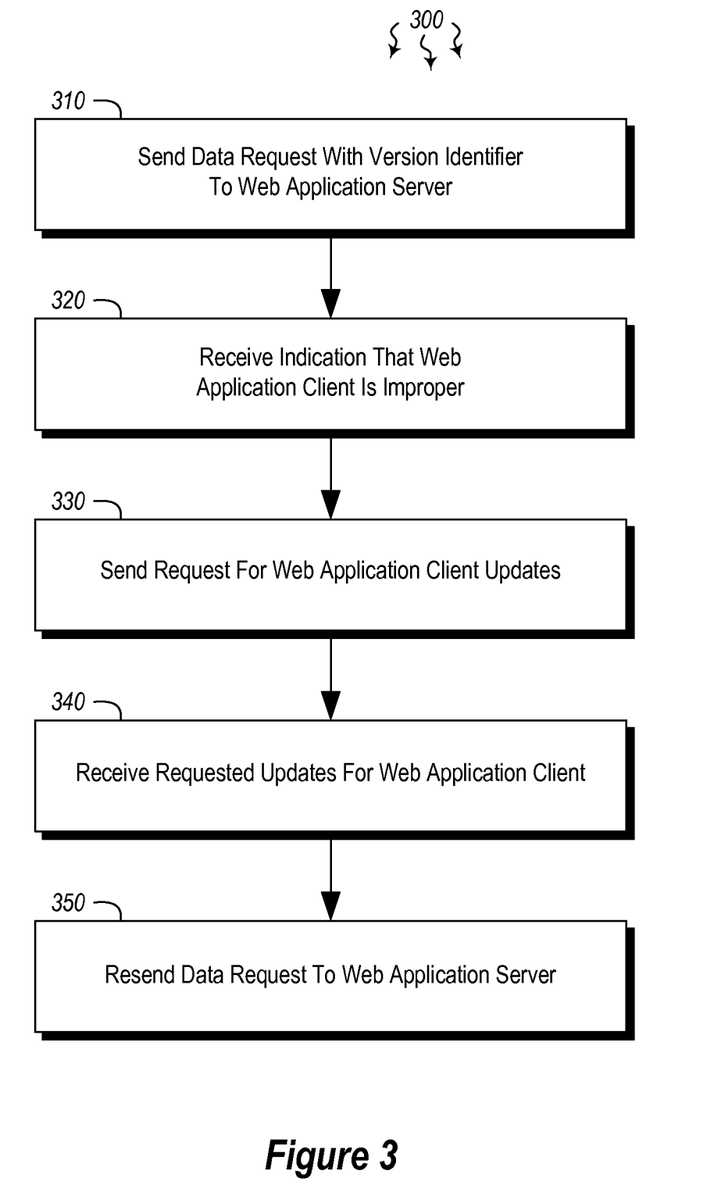
FIG. 3 illustrates a flowchart of an example method for maintaining proper versions between web application clients and servers.
Figure 4:
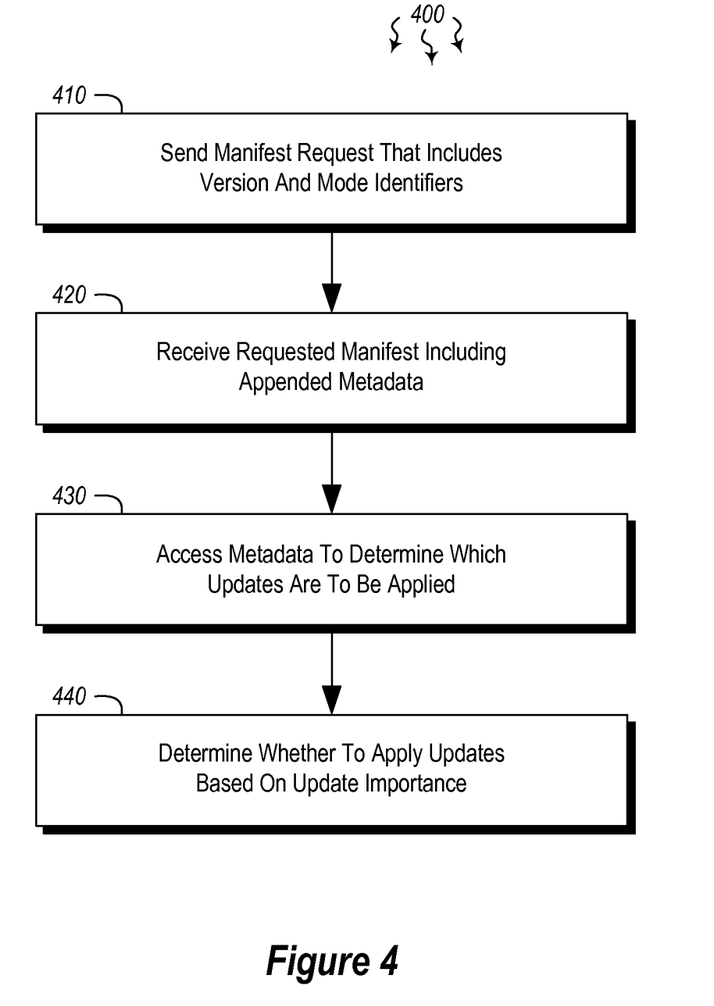
FIG. 4 illustrates a flowchart of an example method for determining whether to apply a web application update.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for maintaining coherence between web application versions. The method 200 will now be described with frequent reference to the components and data of environment 100.

Method 200 includes an act of receiving a data request from a web application client for one or more portions of specified data, the data being indexed according to a web application schema, the data request including a web application client version identifier (act 210). Method 200 further includes an act of determining that the requested data is not accessible using the web application schema (act 220). Method 200 also includes an act of updating the web application schema to a current version of the web application schema (act 230) and an act of processing the received data request using the updated web application schema (act 240).

In some embodiments, the data request 108 includes a web application client version identifier in a header 109 of the data request. As mentioned previously, with the client computer system being able to connect to any of a variety of different server computer systems (e.g. 125) potentially located around the world, the server version and the web application client versions may have a mismatch. In some cases, the server version will be newer, and in some cases the web application client will be newer. Such scenarios may not always result in an incompatibility. For example, the change to the server or client application may be minor, or may be backwards-compatible. In other cases, the change may be substantial, and data requests generated by the client may not be processable by the server. Thus, if a web application client sends a request that cannot be processed by the server, the server schema 132 may be updated before the data request is processed.

Figure 5:
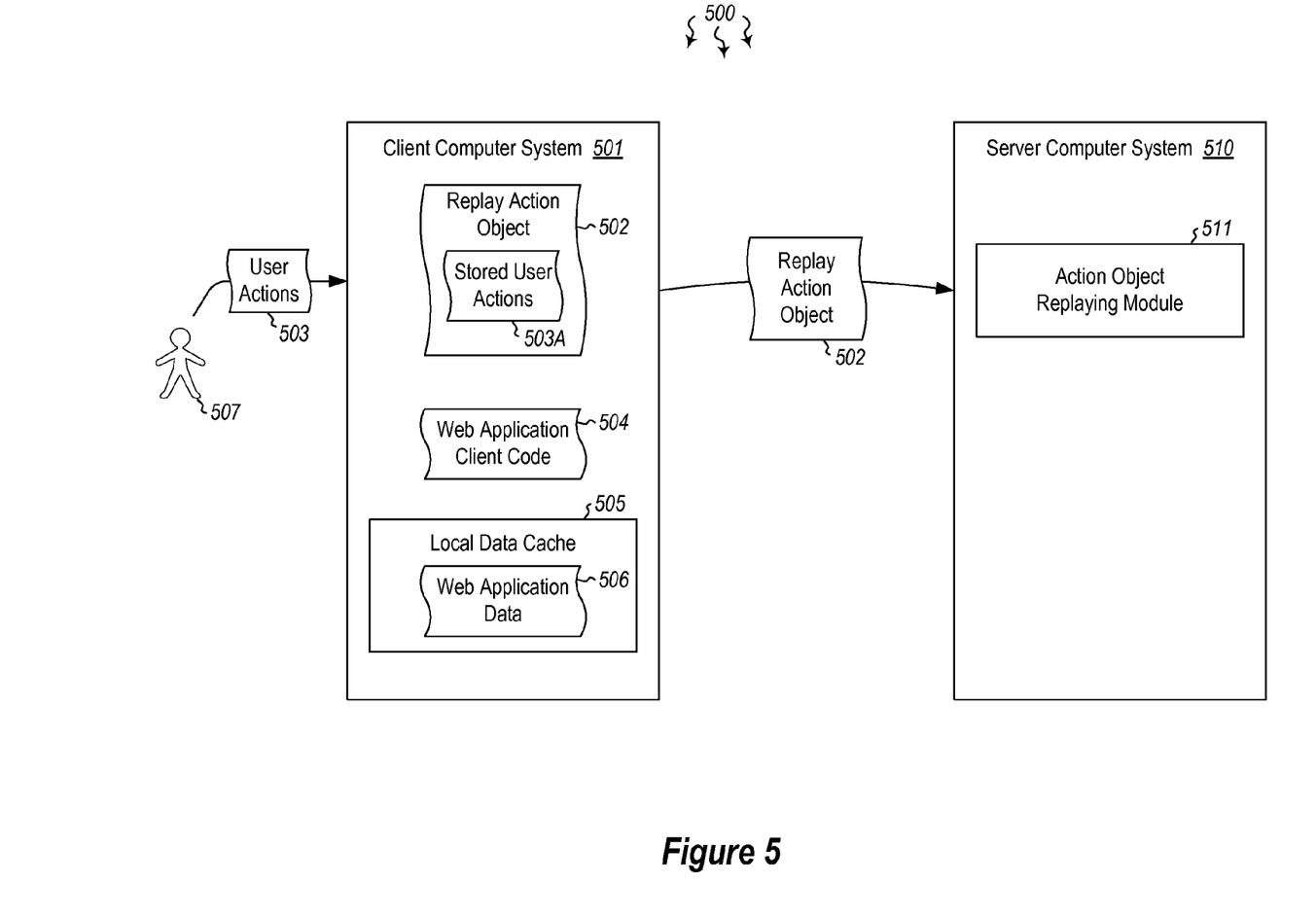
FIG. 5 illustrates a computing environment in which replay action objects are stored and transmitted to a server computer system.

The web application client 103 may be run on substantially any type of computing system. As shown in FIG. 5, the software code 504 for the web application client itself may be stored locally on the client's computer system 501. Any corresponding web application data 506 (e.g. email, contacts, calendar entries, etc.) may be stored in a local data cache 505 on the client's computer system 501. The stored data may include client store objects (e.g. conversations, or other object), each of which has a "shape" with properties such as subject, date, last update, etc. The shape of each client store object may change between web application client versions, which may lead to incompatibilities. For instance, a newer version may add new features or properties to (or remove existing features from) the shape of a client store object.

Users may interact with these client store objects, at least indirectly, by interacting with the web application data 506. For instance, the user may read, flag or delete email messages, may update contact data or add new contacts, or may add or update meetings on their calendar. These actions 503 of the user 507 may be tracked in a replay action object 502. The replay action object stores the user's actions 503A, especially in cases where the user is working offline. For instance, the web application client 103 may be instantiated while disconnected from the server 510. Then, at some future point when the user connects to the server 510, the user's stored actions 503A may be sent to the server 510 as part of the replay action object 502. The action object replaying module 511 of the server 510 may then replay the user's actions to perform (on the server side) all of the actions that were taken by the user when the web application client 103 was offline. The replay action object may be saved on the client computing system 501, and may be in a saved state when the web application code 504 is updated. Thus, the web application client code may be updated, for example, after the user has performed a series of actions and, despite the upgrade in code, the user's actions will still be taken on the server once the client is connected to the server. In some cases, it should be noted, web application data 506 may be embedded in or included with the replay action object 502.

FIG. 3 illustrates a flowchart of a method 300 for maintaining proper versions between web application clients and servers. The method 300 will now be described with frequent reference to the components and data of environment 100.

Method 300 includes an act of sending a data request to a web application server for one or more portions of data corresponding to a web application client user, the data request including a header that includes a current version identifier for the web application client (act 310). Method 300 next includes an act of receiving, from the web application server, an indication that the web application client is improper (act 320) and an act of sending, in response to the indication, a request for web application client updates (act 330). Method 300 further includes an act of receiving at least one of the requested updates for the web application client (act 340) and an act of resending the data request to the web application server for the one or more portions of data corresponding to the web application client user (act 350).

In some cases, the indication that the web application client is improper (i.e. invalid indication 110) may include a specified error code, which may identify the problem more specifically to the user 106. For instance, the error code may indicate that the data objects' shapes are improper, or that an expected data field is not present. As such, the user can determine how the problem is to be resolved. Once resolved (for example, by upgrading the web application client to a newer version), the data request 108 may be resent to the server 125. The resent data request may be sent at substantially any time, and may specifically be sent after a period of time in which the web application client 103 was offline. At least in some cases, those actions that may be performed by the web application client 103 offline are backwards compatible with previous server or client versions. That way, when the replay action object 502 is uploaded to the server, the server will be able to perform those actions, even if the server version has been upgraded.

In some embodiments, the web application client 103 or the server 125 may determine that a version mismatch exists between the web application client and the web application server. A client-side action queue may be instantiated which receives communications from the web application server and also communicates with a local data store. These actions may be queued, for example, when a connection to the server is intermittent. When the connection is again steady, the actions may be sent to the server 125 as replay action objects 502. It should be noted that, at least in some cases, version headers may be omitted for replay action objects. This ensures that, even if the stored user actions 503A in the replay action object are not backwards-compatible between versions, the web application client user's offline actions will be processed (or at least processing thereof will be attempted). If the user's actions cannot be processed, an error code may be sent along with an invalid client indication 110.

FIG. 4 illustrates a flowchart of a method 400 for determining whether to apply a web application update. The method 400 will now be described with frequent reference to the components and data of environment 100.

Method 400 includes an act of sending, from a web application client, a manifest request that includes a first cookie, the first cookie including a current version identifier and a mode identifier for the web application client (act 410). Method 400 next includes an act of receiving the requested manifest, the manifest including a second cookie having metadata that includes at least one of the following: a server code version identifier for a current version of web application server code and a user-specific, client-side installation modifier (act 420). Method 400 further includes an act of accessing the second cookie of the received manifest to determine which updates are to be applied to the web application client, based on the version identifiers included in the second cookie's metadata (act 430) and an act of determining whether to apply the determined updates to the web application client based on a specified level of importance for each determined update (act 440).

In some embodiments, the user-specific, client-side installation modifier is a current theme identifier for the web application client, or a current language identifier for the web application client. The current theme and language are typically not stored as part of downloaded web application client code (e.g. web application client code 504 of FIG. 5), and may be stored separately. These and other user-specific properties may thus be stored in a local data cache 505 or other location that is separate from the web application client code 504. In some cases, the manifest 117 may be stored in a versioned directory to more easily determine which client or server version a manifest corresponds to. Thus, for example, a manifest that is version 2.0 may be stored in a directory that includes "/Version 2.0/" (or some other variant thereof) in the directory tree structure. In this manner, a manifest of version 1.5 would be stored in the "version 1.5" folder, while a version 2.6 would be stored in a "version 2.6" folder, allowing a user to easily determine which client or server version a manifest belongs to.

In some cases, schema changes (e.g. to server schema 132) may be designated as high priority changes, and may be higher priority than other changes. For example, theme changes may be designated as low priority. Theme changes are unlikely to result in major errors, while schema changes are much more likely to produce errors or introduce incompatibilities. Other changes may similarly be categorized as high priority or low priority. The higher priority changes may be propagated first, while the lower priority changes are propagated last. The cookies within the manifests may indicate different things, including any one or more of the following: which version of the manifest is to be used, whether an existing manifest is to be uninstalled, and the mode that the web application client is operating in (kiosk mode or offline mode). In some cases, the same manifest may be used for both kiosk mode and offline mode, where the mode identifier 116 for the web application client 103 identifies which mode (kiosk or offline mode) is to be used. In this manner, information may be communicated between the client and the server using the manifest request 113.

Accordingly, methods, systems and computer program products are provided which maintain coherence between web application versions. Moreover, methods, systems and computer program products are provided which maintain proper versions between web application clients and servers and determine whether to apply a web application update.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A server computer system comprising the following:
one or more processors;
system memory; and
one or more computer-readable storage media having stored thereon computer-executable instructions that are executable by the one or more processors, and that configure the server computer system to maintain coherence between web application versions, including computer-executable instructions that configure the server computer system to perform at least the following:
receive, from a web application client, a replay action object that specifies a series of user actions that were performed at the web application client, the specified series of user actions of the replay action object being replayed upon determining that the web application client has connected to the server computer system, wherein replaying the replay action object produces a data request, and wherein a version header is omitted for the replay action object to ensure that offline actions that were performed at the web application client are processed;
access the data request from the web application client for one or more portions of specified data, the data being indexed according to a first version of a web application schema;
determine that the requested data includes at least one specified element provided by a second version of the web application schema that is not accessible using the first version of the web application schema;
update the web application schema to the second version of the web application schema, the second version of the web application schema being configured to handle the at least one specified element that is not accessible using the first version of the web application schema; and
process the received data request using the updated web application schema.

2. The server computer system of claim 1, wherein software code for the web application client is stored locally on the client's computer system, and wherein the web application data is stored in a local data cache on the client's computer system.

3. The server computer system of claim 1, also including computer-executable instructions that configure the server computer system to store the one or more user actions included in the replay action object.

4. A client computer system comprising the following:
one or more processors;
system memory; and
one or more computer-readable storage media having stored thereon computer-executable instructions that are executable by the one or more processors, and that configure the client computer system to maintain proper versions between web application clients and servers, including computer-executable instructions that configure the client computer system to perform at least the following:
generate, at a web application client, a replay action object that specifies a series of user actions that are performed at the web application client, the specified series of user actions of the replay action object being replayable upon determining that the web application client has connected to a web application server, wherein replaying the replay action object produces a data request, and wherein a version header is omitted for the replay action object to ensure that offline actions that were performed at the web application client are processed;

send the data request to the web application server for one or more portions of data, the data being indexed according to a first version of a web application schema;

receive, from the web application server, an indication that the web application client has requested data that includes at least one specified element provided by a second version of the web application schema that is not accessible using the first version of the web application schema;

send, in response to the indication, a request for web application client updates;

receive at least one of the requested updates for the web application client, such that the web application client is upgraded to handle the at least one specified element that is not accessible using the first version of the web application schema; and resend the data request to the web application server for the one or more portions of data.

5. The client computer system of claim 4, wherein the indication further indicates that the web application client is improper, the indication including a specified error code.

6. The client computer system of claim 5, wherein the specified error code is configured to trigger a selective refresh of the web application client.

7. The client computer system of claim 4, also including computer-executable instructions that configure the client computer system to resend the data request after a period of time in which the web application client was offline.

8. The client computer system of claim 4, wherein offlineable actions are backwards compatible.

9. The client computer system of claim 4, also including computer-executable instructions that configure the client computer system to, upon determining that a version mismatch exists between the web application client and the web application server, utilize a client-side action queue to communicate to the web application server, which in turn communicates with a local data store.

10. A computer system comprising the following:
one or more processors;
system memory; and
one or more computer-readable storage media having stored thereon computer-executable instructions that are executable by the one or more processors, and that configure the computer system to determine whether to apply a web application update, including computer-executable instructions that configure the computer system to perform at least the following:

send, from a web application client, a manifest request that requests a manifest and that includes a first cookie, the first cookie including a current version identifier and a mode identifier for the web application client, the requested manifest being stored in a versioned directory, wherein the first cookie specifies whether an existing manifest is to be uninstalled;

receive the requested manifest, the received manifest including a second cookie having metadata that includes at least one of the following: a server code version identifier for a current version of web application server code and a user-specific, client-side installation modifier;

access the second cookie of the received manifest to determine which updates are to be applied to the web application client, based on at least one of the server code version identifier and the client-side installation modifier included in the second cookie's metadata; and determine whether to apply the determined updates to the web application client based on a specified level of importance for each determined update.

11. The computer system of claim 10, wherein the user-specific, client-side installation modifier includes at least one of a current theme identifier for the web application client, and a current language identifier for the web application client.

12. The computer system of claim 11, wherein the current theme and language are not stored as part of downloaded web application client code.

13. The computer system of claim 11, wherein the current theme and language are stored separately.

14. The computer system of claim 10, wherein the versioned directory is accessed to determine which client or server version the manifest corresponds to.

15. The computer system of claim 10, wherein the mode identifier for the web application client identifies at least one of a kiosk mode and an offline mode.

16. The computer system of claim 10, wherein schema changes are designated as high priority changes and theme changes are designated as low priority.

17. The computer system of claim 10, wherein the first cookie specifies at least one of the following: which version of the manifest is to be used and a mode that the web application client is operating in.

* * * * *